US011232173B2

(12) United States Patent
Jamsek et al.

(10) Patent No.: US 11,232,173 B2
(45) Date of Patent: Jan. 25, 2022

(54) SYSTEM, METHOD AND COMPUTER PROGRAM PRODUCT FOR DENSE/SPARSE LINEAR SYSTEM SOLVER ACCELERATOR

(71) Applicant: International Business Machines Corporation, Armonk, NY (US)

(72) Inventors: Damir Anthony Jamsek, Austin, TX (US); Maysam Mir Ahmadi, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/414,124

(22) Filed: Jan. 24, 2017

(65) Prior Publication Data

US 2018/0210860 A1 Jul. 26, 2018

(51) Int. Cl.
*G06F 17/11* (2006.01)
*G06F 17/16* (2006.01)

(52) U.S. Cl.
CPC .............. *G06F 17/11* (2013.01); *G06F 17/16* (2013.01)

(58) Field of Classification Search
CPC .................................. G06F 17/11; G06F 17/16
See application file for complete search history.

(56) References Cited

U.S. PATENT DOCUMENTS

| 6,226,321 | B1* | 5/2001 | Michels | G01S 7/292 |
| | | | | 375/227 |
| 6,771,723 | B1* | 8/2004 | Davis | G01S 7/2921 |
| | | | | 375/227 |
| 9,411,657 | B2* | 8/2016 | Roy | G06F 9/5083 |
| 2002/0082812 | A1* | 6/2002 | Yamaguchi | G06F 17/5009 |
| | | | | 703/2 |
| 2017/0262411 | A1* | 9/2017 | Nakanishi | G06F 17/16 |
| 2018/0210860 | A1* | 7/2018 | Jamsek | G06F 17/16 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Matthew D Sandifer
(74) *Attorney, Agent, or Firm* — Vazken Alexanian; McGinn I.P. Law Group, PLLC.

(57) ABSTRACT

A linear system solving method, system, and computer program product, include calculating a matrix factorization for a matrix in a pair of matrices, in a form of a lower, a diagonal, an upper (LDU) decomposition, solving a first expression for a first value using a substitution module to create a first result, dividing the first result by values stored in the diagonal of the matrix to obtain a second result, and solving a second expression for a second value where a processing of the diagonal is skipped by using the second result.

16 Claims, 7 Drawing Sheets

SYSTEM, METHOD AND COMPUTER PROGRAM PRODUCT FOR DENSE/SPARSE LINEAR SYSTEM SOLVER ACCELERATOR

BACKGROUND

The present invention relates generally to a linear system solving method, and more particularly, but not by way of limitation, to a system, method, and computer program product for solving dense/sparse linear systems.

Conventionally, solving a linear system is the basis of many algorithms. A majority of the processing time in modern servers are devoted to solving linear systems. Currently, software packages are widely used to calculate the solution. For example, Basic Linear Algebra Subprograms (BLAS) library has routines specifically designed for this purpose. Alternatively, a Math Kernel Library (MKL) is widely used on some systems to achieve the performance by utilizing the capabilities of the systems.

However, the conventional techniques use main processors and no accelerator is involved. Some have considered techniques to accelerate linear system solvers using graphics processing units (GPUs) and although some speedups for dense system problems are reported, there has been no practical speedup for sparse systems. Since most practical problems are defined by sparse matrices, this limits the application of such implementations. Moreover, GPUs operate at high power, and offloading the calculations to GPUs for their potential speedup does not lead to energy savings and might even increase it.

Thus, there is a need in the art for accelerating linear system solving operations or offloading a part of the process to other processing elements such as a custom accelerator which could potentially improve the performance of the system or lead to energy savings and amelioration of the heat dissipation challenge in server farms.

SUMMARY

In an exemplary embodiment, the present invention can provide a computer-implemented linear system solving method, the method including calculating a matrix factorization for a matrix in a pair of matrices, in a form of a lower, a diagonal, an upper (LDU) decomposition, solving a first expression for a first value using a substitution module to create a first result, dividing the result by values stored in the diagonal of the matrix to obtain a second result, and solving a second expression for a second value where a processing of the diagonal is skipped by using the second result.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
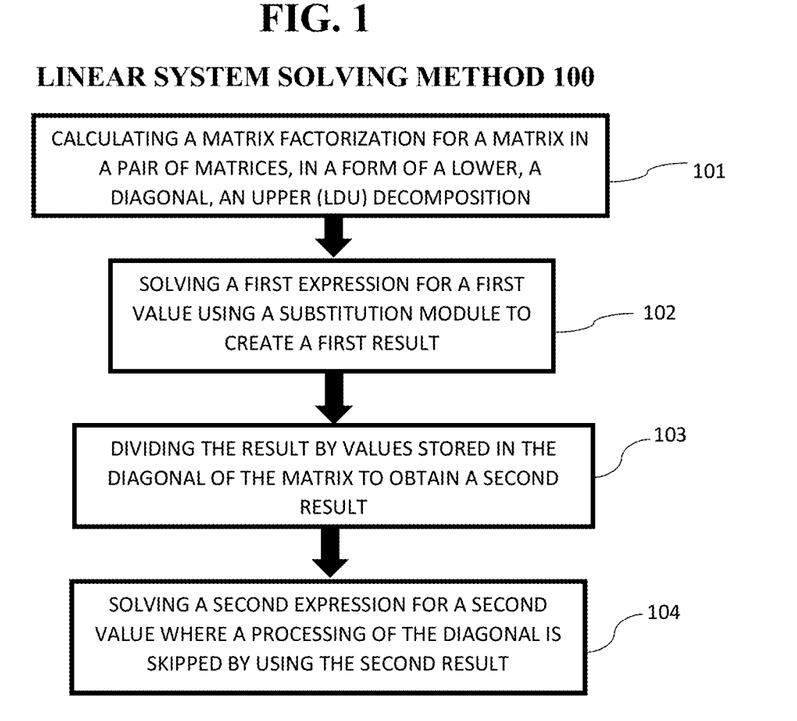
FIG. 1 exemplarily shows a high-level flow chart for a linear system solving method 100.

With reference now to the example depicted in FIG. 1, the linear system solving method 100 includes various steps for solving sparse/dense linear systems. As shown in at least FIG. 5, one or more computers of a computer system 12 according to an embodiment of the present invention can include a memory 28 having instructions stored in a storage system to perform the steps of FIG. 1.

Although one or more embodiments (see e.g., FIGS. 5-8) may be implemented in a cloud environment 50 (see e.g., FIG. 6), it is nonetheless understood that the present invention can be implemented outside of the cloud environment.

In the embodiments described below, an accelerator (e.g., linear system solving method) can be designed for solving sparse linear systems. However, the flexibility of the design allows for use of the method for dense matrices as well. The method 100 is developed for Power8 systems and implemented on Field Programmable Gate Arrays (FPGA). The method 100 can interact directly with the system memory through the Coherent Accelerator Processor Interface (CAPI) interface provided in Power8 systems.

It is noted that the matrices that represent the linear system can be stored in many different formats. Among those, Compressed Sparse Row (CSR) and Compressed Sparse Column (CSC) are the most general and most used. High-performance solvers can store key matrices in both formats as each of them can achieve the optimum performance in particular steps of problem solving. Storing and maintaining both formats are a challenge by itself.

Thereby, the method 100 can work with both CSR and CSC formats and can solve both FTRAN and BTRAN operations. Although the performance of the system depends on the actual structure of the data being used, the slow-down is far less than that of the overhead caused by maintaining two copies of matrices.

Also, the method 100 implements several speed-up techniques for taking advantage of sparse matrices. Moreover, although the accelerator is developed for Power8 systems, it is possible to migrate the design to other processors as well.

As further described below, in steps 101-104, the method 100 performs lower-diagonal-upper (LDU) decomposition (i.e., step 101), forward substitution (i.e., step 102), division by "D" (i.e., step 103), and backwards substitution (i.e., step 104).

Figure 2:
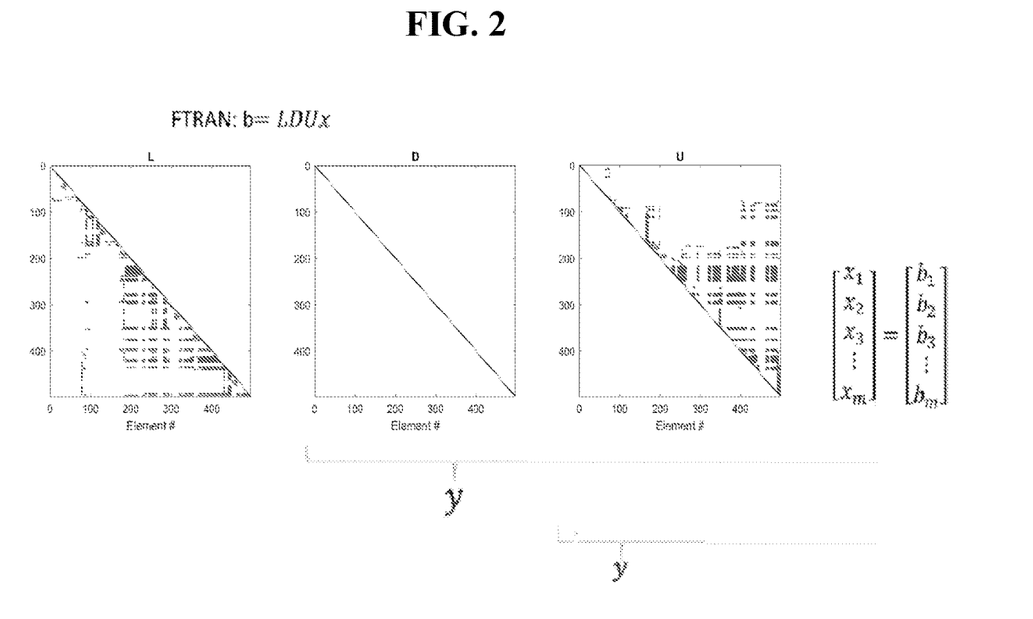
FIG. 2 exemplarily depicts matrices involved in the method 100.

It is further noted that FIG. 2 exemplarily depicts matrices involved in steps 101-104.

In step 101, a matrix factorization for a matrix in a pair of matrices is calculated, in a form of a lower, a diagonal, an upper (LDU) decomposition. That is, a matrix factorization for a matrix U in a pair of matrices U and L, in a form of a lower, diagonal, upper (LDU) decomposition is calculated, where in the LDU decomposition all elements of U are divided by their corresponding diagonal element to make the diagonal entries equal to a value "1" and where the diagonal entries are then stored in "D".

In other words, in step 101, the LDU decomposition is calculated. The process is similar to LU decomposition except that all elements of U are divided by their corresponding diagonal element to make the diagonal entries equal to 1. The diagonal entries are then stored in D. The reason behind using LDU instead of LU is that it is best suitable for stream processing especially in hardware.

In step 102, a first expression for a first value is solved for by using a substitution module to create a first result. That is, an expression of $L_y=b$ is solved for b using a substitution module to create a result, where the substitution module performs a forward and backward substitution using a same engine as used in the LDU decomposition to calculate an expression of $$b_i - \sum_{k=0}^{i=1} L_{ik} x_k$$

(i.e., [1]).

In step 103, the result is divided by values stored in the diagonal of the matrix to obtain a second result.

In step 104, a second expression is solved for a second value where a processing of the diagonal is skipped by using the second result. For example, an expression of $$Ux = \frac{y}{D}$$

(i.e., [2]) for y, where in a forward transformation (FTRAN), "$y_1=b_1$" is set as "$L_{11}=1$", then "$y_2=b_2-y_1L_{21}$" and continuing for each element of y using $$y_i = b_i - \sum_{k=0}^{i=1} L_{ik} y_k$$

(i.e., [3]) until a last element is reached and wherein processing of diagonal entries is skipped.

Figure 3:
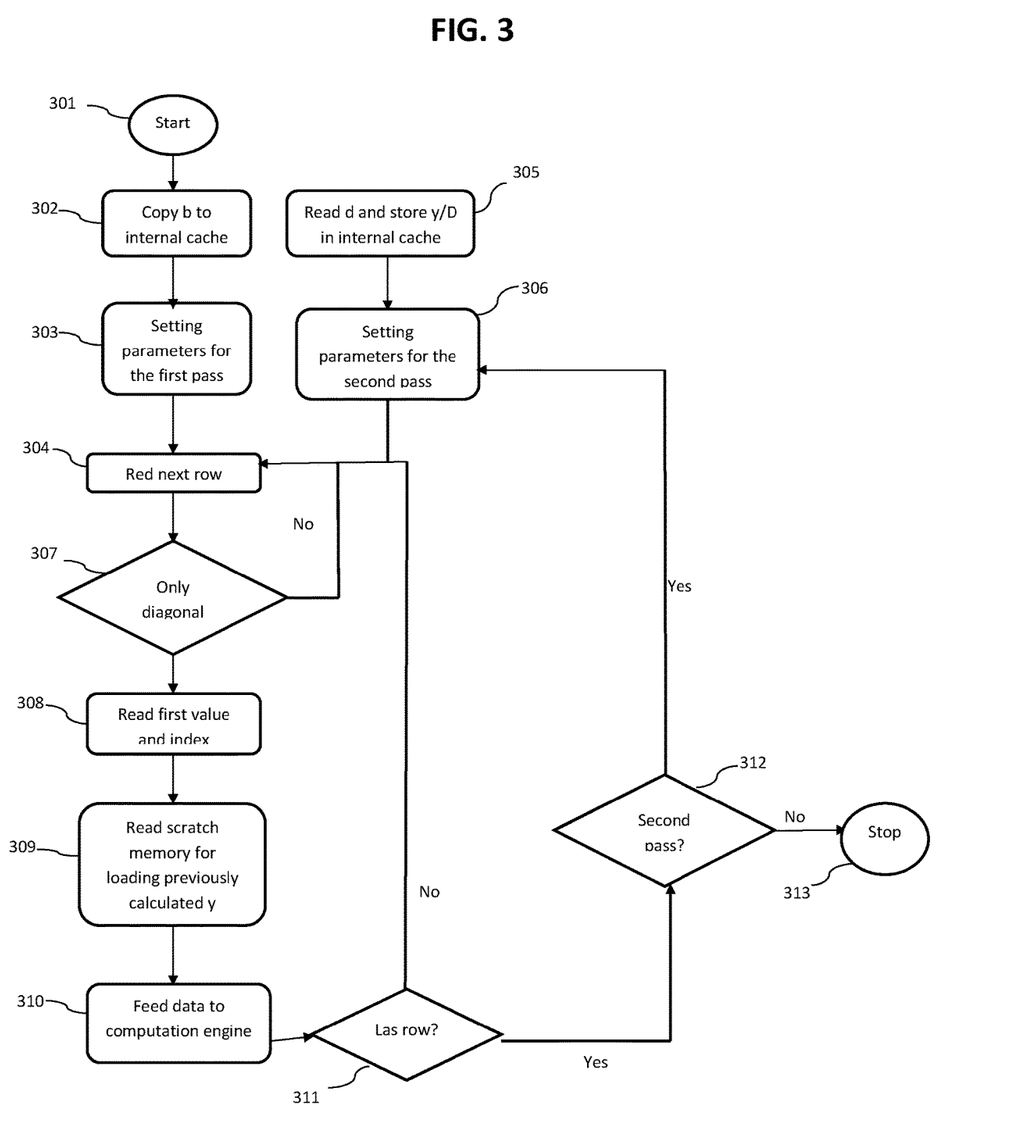
FIG. 3 exemplarily depicts a substitution engine for forward and backward substitution.

Steps 102 and 104 are performed by the substitution engine (i.e., module) as exemplary depicted in FIG. 3. It is noted that there are two types of linear system such as solving "Ax=b" or solving "xA=b", which are known as FTRAN and BTRAN, respectively. The core task of the substitution module is to calculate [1]. In FTRAN, the solving process starts by setting "$y_1=b_1$" as "$L_{11}=1$". Then, "$y_2=b_2-y_1L_{21}$". The process then continues to solve next elements of "y" using "$y_i=b_i-[1]$" in sequence up to the last element. In the BTRAN, the process happens in reverse as the U matrix is an upper triangular.

The flowchart of the substitution process is depicted in FIG. 3.

Step 301 is the entry point to our substitution algorithm. Step 302 prepares the result to left hand side of the equation being solved. Step 303 conditions parameters to be used for the first pass. In step 304 we proceed row by row. Step 305 checks if the row only contains a diagonal element in which case no work need be done and we return to 304 for the next row. Step 308 identifies additional row data needed. Step 309 fetches the data. Step 310 processes this row.

Step 311 determines if we have completed the rows. Step 312 decides if second pass is needed. Step 305 fetches data needed for second pass, Step 306 begins second pass and proceeds to step 304 as above. Finally arriving at Step 313 for completion.

It is noted that forward substitution (i.e., step 102) and backward substitution (i.e., step 104) are done using the same engine. Therefore, only one LDU decomposition engine and only one substitution engine are required for the entire system. This is a major advantage of the present invention. Also, as LDU decomposition engine is virtually working independent of the substitution engine, the LDU decomposition engine can work on another problem while substitution engine is processing its given task. This is a major advantage of the present invention. In addition, diagonal entries do not require any processing in the system and they are skipped to improve performance as illustrated in FIG. 3.

It is noted that a challenge to work with CSC and CSR is that, in FTRAN, the stream of $L_{ik}$ are read from the memory in proper order for the calculation when the matrix is stored in CSR. For BTRAN, the matrix has to be in CSC for natural streaming of data. If matrixes are not in the proper natural order, the architecture needs to take care of out of order data. More specifically, L and U matrices should be transposed to allow stream processing. Since transposition is not desirable due to huge memory and time requirement, a new architecture as shown in FIG. 4 is proposed to allow streaming of such matrices.

Figure 4:
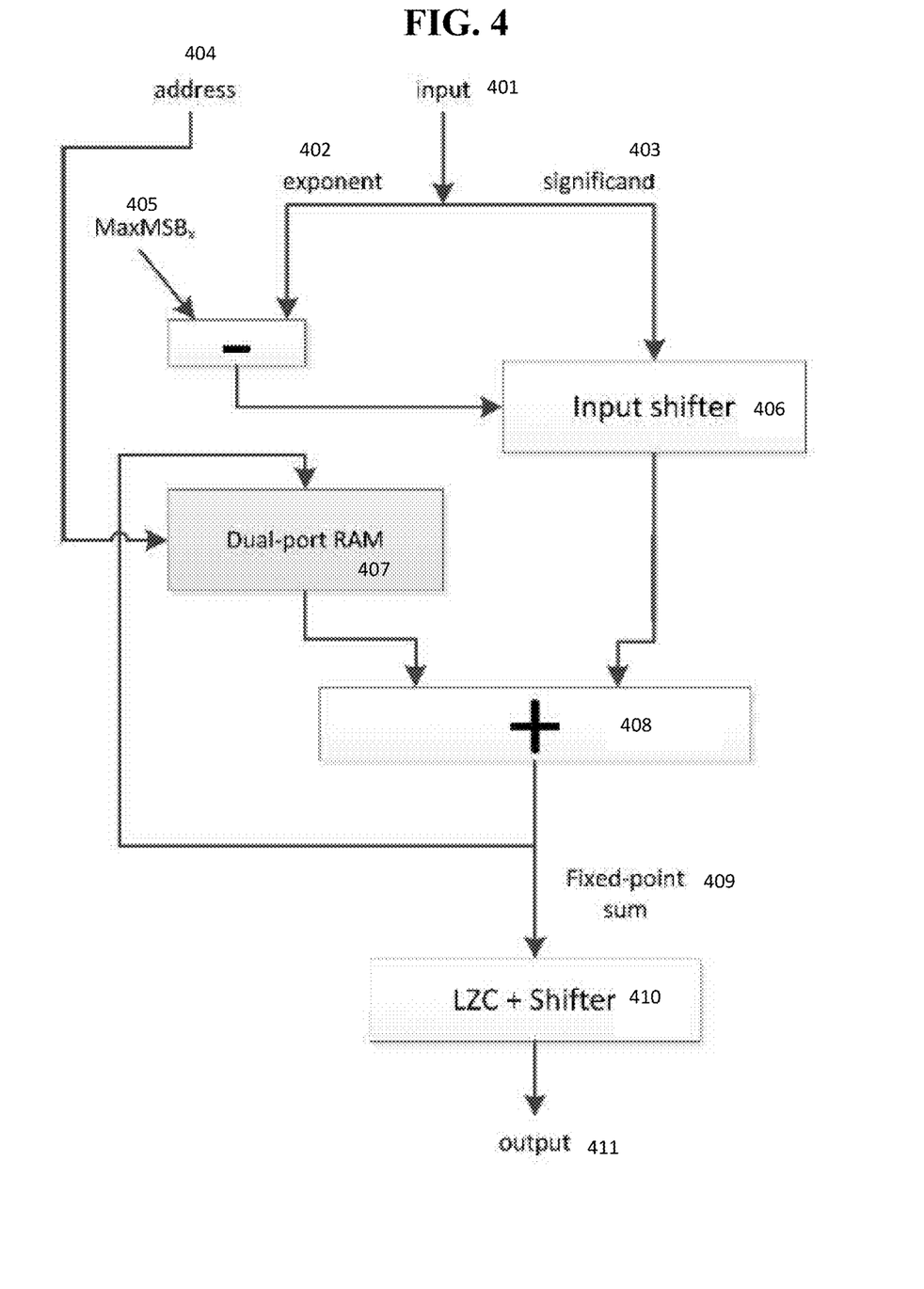
FIG. 4 exemplarily depicts an AHT-MAC architecture for the method 100.

The architecture as exemplarily shown in FIG. 4, namely addressable high throughput multiply accumulator (AHT-MAC), takes two arguments "a" and "b" and an address "r". It multiplies "a" and "b" and adds the results to the last result with the same address "r". This architecture allows processing of data in row-major format where column-major is required or vice versa. In addition to the capability to solve FTRAN and BTRAN, AHT-MAC allows the processing of CSR and CSC formats without extra efforts. The structure of AHT-MAC architecture is shown in FIG. 4.

Step 401 takes a and b inputs, Steps 402/403/406/406 accomplish the combining of a and b as described above. Step 404 brings in the address r to access the memory in 407. Step 408 adds the ab and access of location r. Step 409 is the result that is conditioned in Step 410 to produce output 410.

Using LDU decomposition in the design collects the lengthy division operations, which allows for pipelining.

This simplifies the substitution to Multiple Accumulator (MAC) operations and removes the need for infrequent divisions, which would stall the process.

Considering that the latency of the calculations is on the order of 20 clock cycles and many rows in sparse matrices have only a few non-zeros, it leads to very low usage of calculations engine and lengthy processing time. However, tests show that such strong dependency between rows rarely exists in matrices that represent real problems. Therefore, the design of FIG. 4 is capable of finding such dependencies. If this is not detected, the engine continues to process the next elements, which significantly improves the performance.

Another improvement is that for cases where the system needs to be solved many times with different right-hand side, the method 100 is capable of getting optimal order of elements for processing as an input. This removes the need to stall the engine and improves the performance.

Further, real systems normally have many rows in which only the diagonal exist. For these rows, $x_k = b_k$ and no processing is required. The system is capable of detecting such elements and takes advantage of it.

Thus, the method 100 as well as the substitution engine of FIG. 3 and the AHT-MAC architecture of FIG. 4 can allow the solving of dense or sparse matrices with virtually no overhead, the use of LDU instead of LU which is better suited for stream processing (especially in hardware), the architecture of AHT-MAC which allows solving FTRAN and BTRAN with the same architecture and processing CSR or CSC format inherently, a unique system for detecting dependency between rows and a system to pause/resume the calculations based on that, and for improving performance by taking advantage of only-diagonal rows/columns.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
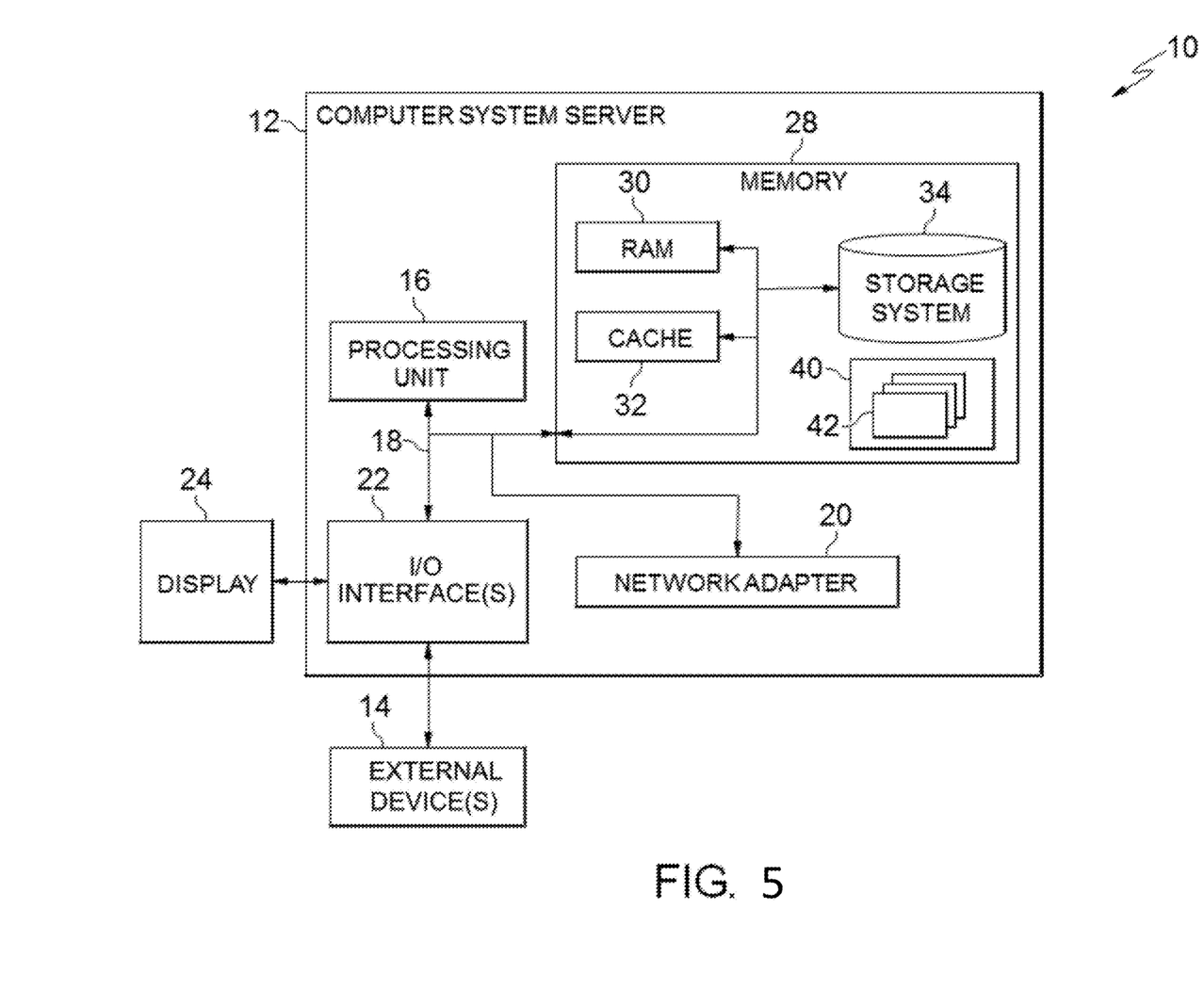
FIG. 5 depicts a cloud computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 5, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
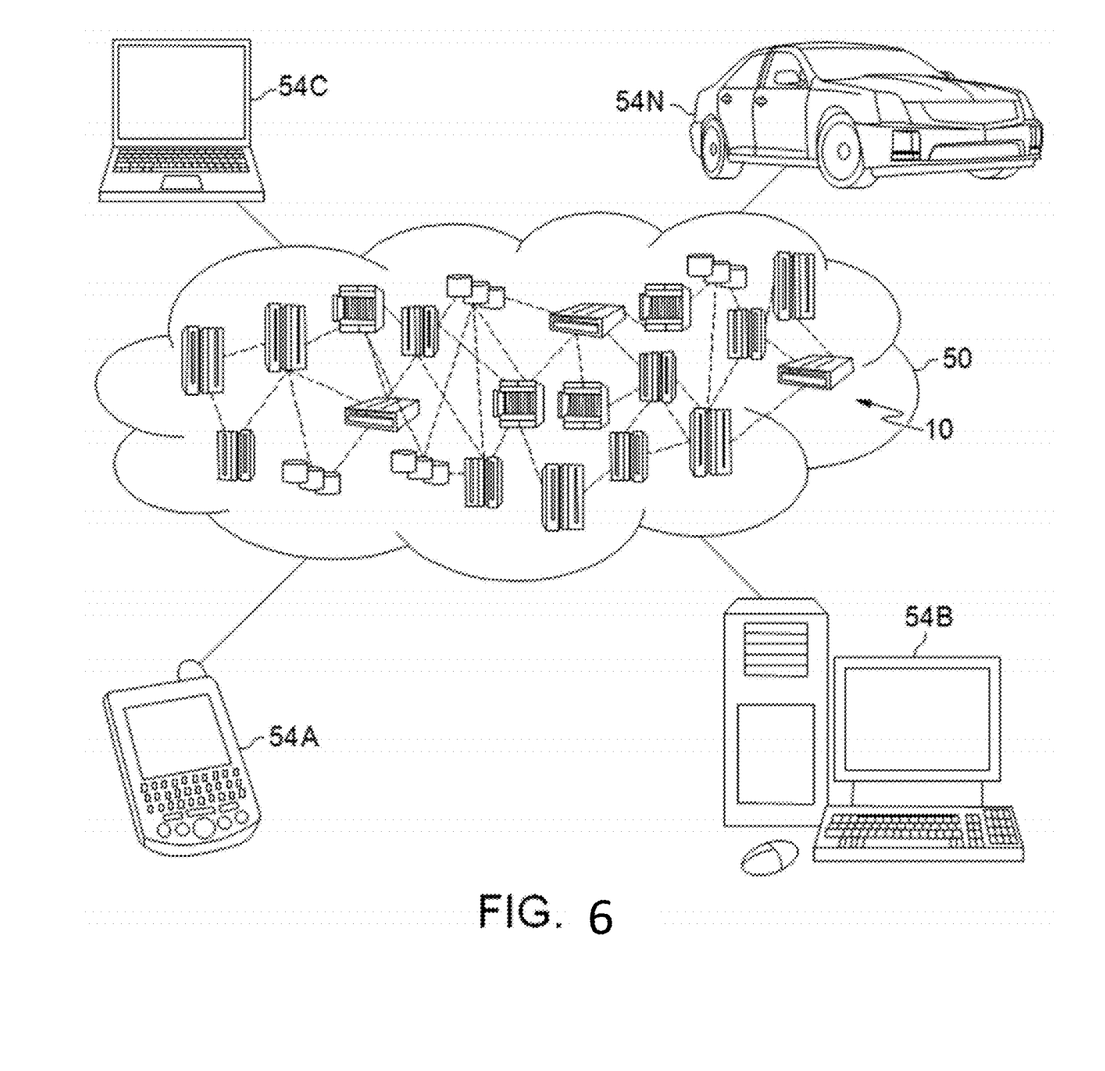
FIG. 6 depicts a cloud computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
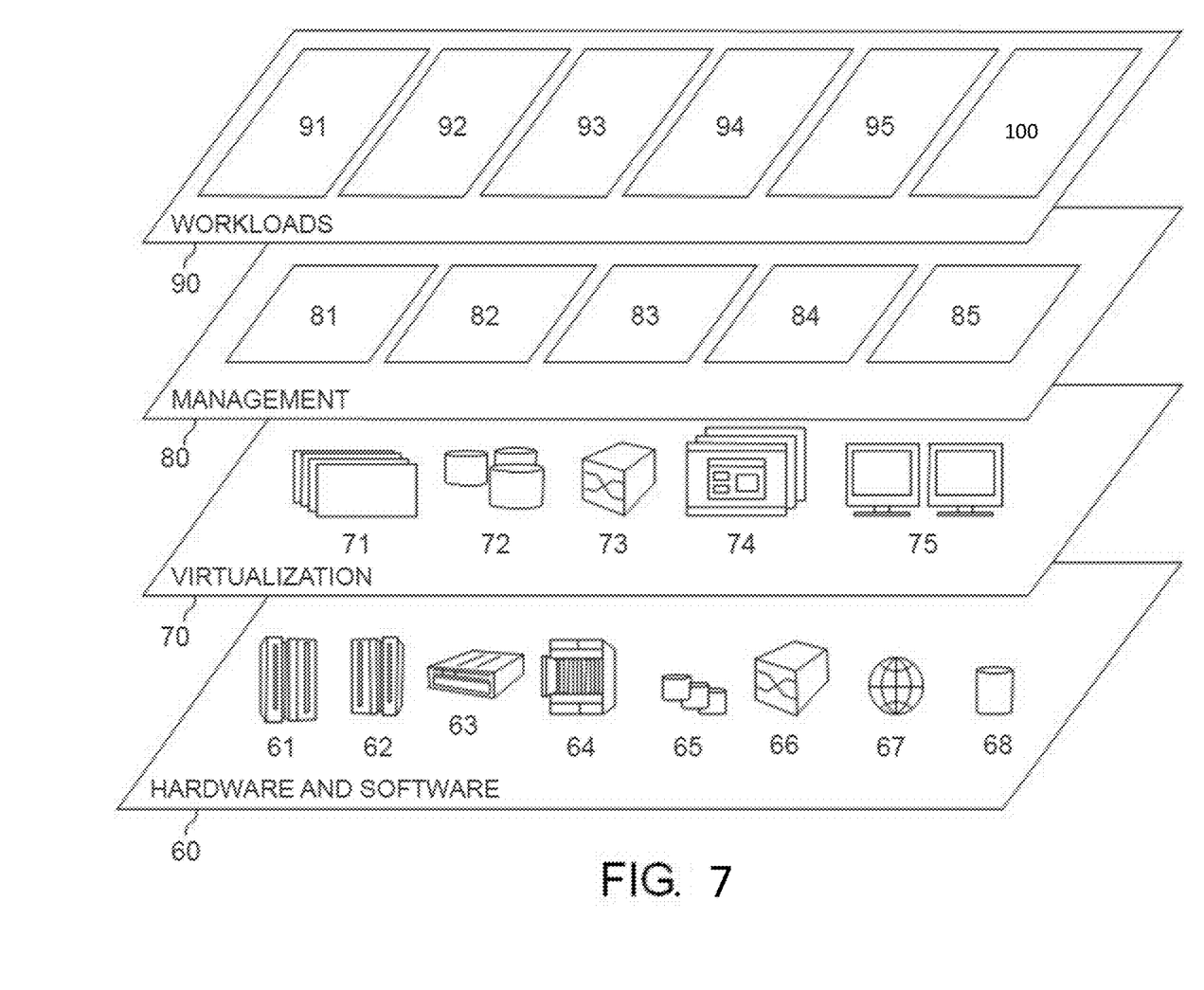
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the linear system solving method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented linear system solving method that interacts with a cloud computing environment server, the method comprising:

calculating, via a cloud on-demand self-service that communicates with the cloud computing environment server, a matrix factorization for a matrix in a pair of matrices, in a form of a lower, a diagonal, and an upper (LDU) decomposition by interacting directly with a system memory through a Coherent Accelerator Processor Interface (CAPI) interface;

first solving, via the cloud on-demand self-service that communicates with the cloud computing environment server, a first expression for a first value calculated from using the first expression using a substitution module based on the LDU decomposition to create a first result;

dividing, via the cloud on-demand self-service that communicates with the cloud computing environment server, the first result by values stored in the diagonal of the matrix to obtain a second result;

second solving, via the cloud on-demand self-service that communicates with the cloud computing environment server, a second expression for a second value calculated from using the second expression where a processing of the diagonal is skipped by using the second result; and determining, via the cloud on-demand self-service that communicates with the cloud computing environment server, a solution set for the pair of matrices in the linear system using the second expression, wherein the calculating proceeds to calculate a second matrix factorization for a second matrix while the first solving, the dividing, and the second solving are working with the matrix on the system memory, and wherein the first solving and the second solving are performed using a same substitution module, further comprising streaming the solution from the cloud to a device, wherein the cloud computing environment server comprises a cloud computing model of a service delivery comprising two or more clouds of a private cloud, a community cloud, and a public cloud that remain unique entities but are bound together by technology that enables data and application portability that results in load-balancing between the two or more clouds.

2. The computer-implemented method of claim 1, wherein the first solving comprises a forward substitution, and wherein the second solving comprises a backwards substitution.

3. The computer-implemented method of claim 1, wherein, in the first solving, the first expression is $L_y=b$ and is solved for the first value of b using the substitution module to create the first result, and wherein the substitution module performs a forward substitution using the same module as used in the LDU decomposition to calculate a third expression of $$b_i - \sum_{k=0}^{i=1} L_{ik} x_k,$$

wherein the first solving comprises a forward substitution, and wherein the second solving comprises a backwards substitution.

4. The computer-implemented method of claim 3, wherein the second solving solves the second expression of $$Ux = \frac{y}{D}$$

for the second value of ⊠ y, and
> wherein, in a forward transformation (FTRAN) in the second solving, "$y_1=b_1$" is set as "$L_{11}=1$", then "$y_2=b_2-y_1L_{21}$" and continuing for each element of y using $$y_i = b_i - \sum_{k=0}^{i=1} L_{ik} y_k$$

until a last element is reached.

5. The computer-implemented method of claim 1, wherein the first solving solves the first expression of Ly=b for the first value y, and
> wherein the second solving solves the second expression of Ux=(y/D) for the second value of x.

6. The computer-implemented method of claim 1, wherein the determining determines the solution for the pair of matrices simultaneously while the calculating calculates a second matrix factorization for a second matrix in a second pair of matrices.

7. The computer-implemented method of claim 1, wherein the first solving, the dividing, and the second solving work with the second matrix after the determining determines the solution for the matrix, and
> wherein the calculating proceeds to calculate a third matrix factorization for a second matrix while the first solving, the dividing, and the second solving are working with the second matrix.

8. The computer-implemented method of claim 7, wherein the calculating continues to calculate a new matrix each time that the first solving, the dividing, and the second solving are working with a prior calculated matrix.

9. The computer-implemented method of claim 1, wherein the calculating continues to calculate a new matrix each time that the first solving, the dividing, and the second solving are working with a prior calculated matrix.

10. A computer program product for linear system solving that interacts with a cloud computing environment server, the computer program product comprising a computer-readable storage medium having program instructions embodied therewith, the program instructions executable by a computer to cause the computer to perform:
> calculating, via a cloud on-demand self-service that communicates with the cloud computing environment server, a matrix factorization for a matrix in a pair of matrices, in a form of a lower, a diagonal, and an upper (LDU) decomposition by interacting directly with a system memory through a Coherent Accelerator Processor Interface (CAPI) interface;
> first solving, via the cloud on-demand self-service that communicates with the cloud computing environment server, a first expression for a first value calculated from using the first expression using a substitution module based on the LDU decomposition to create a first result;
> dividing, via the cloud on-demand self-service that communicates with the cloud computing environment server, the first result by values stored in the diagonal of the matrix to obtain a second result;
> second solving, via the cloud on-demand self-service that communicates with the cloud computing environment server, a second expression for a second value calculated from using the second expression where a processing of the diagonal is skipped by using the second result; and
> determining, via the cloud on-demand self-service that communicates with the cloud computing environment server, a solution set for the pair of matrices in the linear system using the second expression,
> wherein the calculating proceeds to calculate a second matrix factorization for a second matrix while the first solving, the dividing, and the second solving are working with the matrix on the system memory, and
> wherein the first solving and the second solving are performed using a same substitution module,
> further comprising streaming the solution from the cloud to a device,
> wherein the cloud computing environment server comprises a cloud computing model of a service delivery comprising two or more clouds of a private cloud, a community cloud, and a public cloud that remain unique entities but are bound together by technology that enables data and application portability that results in load-balancing between the two or more clouds.

11. The computer program product of claim 10, wherein the first solving comprises a forward substitution, and
> wherein the second solving comprises a backwards substitution.

12. The computer program product claim of 10, wherein, in the first solving, the first expression is $L_y=b$ and is solved for the first value of b ⊠ using the substitution module to create the result, and
> wherein the substitution module performs a forward substitution using a same module as used in the LDU decomposition to calculate a third expression of $$b_i - \sum_{k=0}^{i=1} L_{ik} x_k.$$

13. The computer program product claim of 12, wherein the second solving solves the second expression of $$Ux = \frac{y}{D}$$

for the second value of ⊠ y, and
> wherein, in a forward transformation (FTRAN) in the second solving, "$y_1=b_1$" is set as "$L_{11}=1$", then "$y_2=b_2-y_1L_{21}$" and continuing for each element of y using $$y_i = b_i - \sum_{k=0}^{i=1} L_{ik} y_k$$

until a last element is reached.

14. The computer program product claim of 10, wherein the first solving solves the first expression of Ly=b for the first value y, and
> wherein the second solving solves the second expression of Ux=(y/D) for the second value of x.

15. A linear system solving system, said system comprising:
> a processor; and
> a memory, the memory storing instructions to cause the processor to perform:

calculating, via a cloud on-demand self-service that communicates with the cloud computing environment server, a matrix factorization for a matrix in a pair of matrices, in a form of a lower, a diagonal, and an upper (LDU) decomposition by interacting directly with a system memory through a Coherent Accelerator Processor Interface (CAPI) interface;

first solving, via the cloud on-demand self-service that communicates with the cloud computing environment server, a first expression for a first value calculated from using the first expression using a substitution module based on the LDU decomposition to create a first result;

dividing, via the cloud on-demand self-service that communicates with the cloud computing environment server, the first result by values stored in the diagonal of the matrix to obtain a second result;

second solving, via the cloud on-demand self-service that communicates with the cloud computing environment server, a second expression for a second value calculated from using the second expression where a processing of the diagonal is skipped by using the second result; and determining, via the cloud on-demand self-service that communicates with the cloud computing environment server, a solution set for the pair of matrices in the linear system using the second expression, wherein the calculating proceeds to calculate a second matrix factorization for a second matrix while the first solving, the dividing, and the second solving are working with the matrix on the system memory, and wherein the first solving and the second solving are performed using a same substitution module, further comprising streaming the solution from the cloud to a device, wherein the cloud computing environment server comprises a cloud computing model of a service delivery comprising two or more clouds of a private cloud, a community cloud, and a public cloud that remain unique entities but are bound together by technology that enables data and application portability that results in load-balancing between the two or more clouds.

16. The system of claim 15, wherein the first solving comprises a forward substitution, and wherein the second solving comprises a backwards substitution.

* * * * *